April 10, 1962  J. M. MALIK ET AL  3,028,998
BULK BIN
Filed Feb. 16, 1959  3 Sheets-Sheet 1

Joseph M. Malik
Fred A. Malik
Harry S. McDonald
INVENTORS

BY Clarence A. O'Brien
and Harvey B. Jacobson
Attorneys

April 10, 1962 J. M. MALIK ET AL 3,028,998
BULK BIN
Filed Feb. 16, 1959 3 Sheets-Sheet 2

Joseph M. Malik
Fred A. Malik
Harry S. McDonald
INVENTORS

April 10, 1962 J. M. MALIK ET AL 3,028,998
BULK BIN
Filed Feb. 16, 1959
3 Sheets-Sheet 3

Joseph M. Malik
Fred A. Malik
Harry S. McDonald
INVENTORS

BY Clarence A. O'Brien
and Harvey B. Jacobson
Attorneys

United States Patent Office 3,028,998
Patented Apr. 10, 1962

3,028,998
BULK BIN
Joseph M. Malik, Fred A. Malik, and Harry S. McDonald,
all of P.O. Box 751, Toccoa, Ga.
Filed Feb. 16, 1959, Ser. No. 793,427
2 Claims. (Cl. 222—142)

The present invention generally relates to storage bins or tanks and more particularly to a dispensing bin which is especially adapted for use in storing and handling seed, grain and similar flowable materials.

It is a well known problem that storage space for various materials must be held to a minimum for purposes of economy and must be stored in such a manner that the material is readily available for use. This is especially true in connection with seed, grain or the like. It is also necessary that the storage bin be flexible as to size so that the quantity of material stored in a particular bin may be varied. Therefore, it is the primary object of the present invention to provide a bulk storage bin which has a tapered wall construction at the lower end together with agitators and discharge doors for discharging or dispensing the material from the bins wherein the particular tapered construction permits better flow of the stored material and also stacking of one bin into another for creating a saving in transportation space.

Another object of the present invention is to provide a bulk bin having open areas underlying the same which provides for circulation of air in relation to the bins.

A further important feature of the present invention is to provide a bulk bin which incorporates features of rigidity and stacking or nesting which allows the bin to be expanded vertically and which also permits the bins to be stored or stacked in partially nested relationship.

A further feature of the present invention is to provide a bulk bin which is simple in construction, easy to use, efficient in operation, well adapted for the purposes for which the same is intended and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
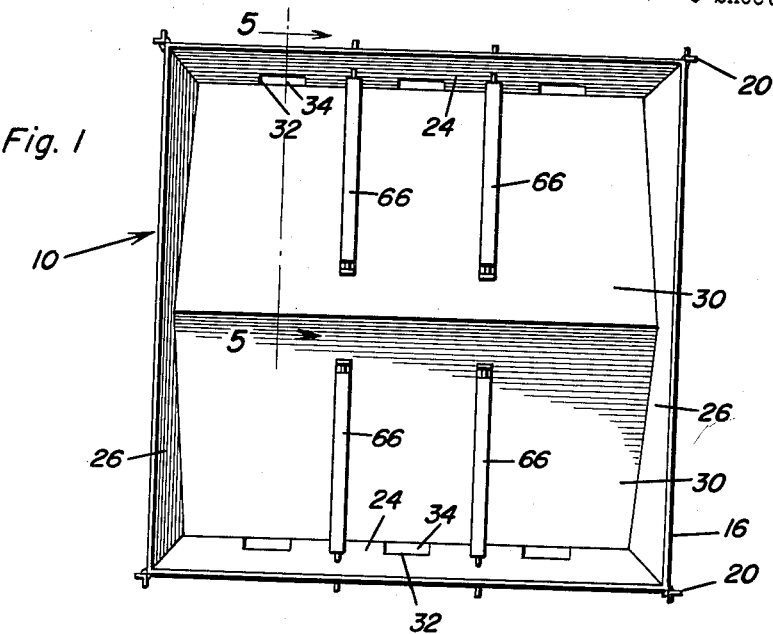
FIGURE 1 is a plan view of the bulk bin of the present invention.
Figure 2:
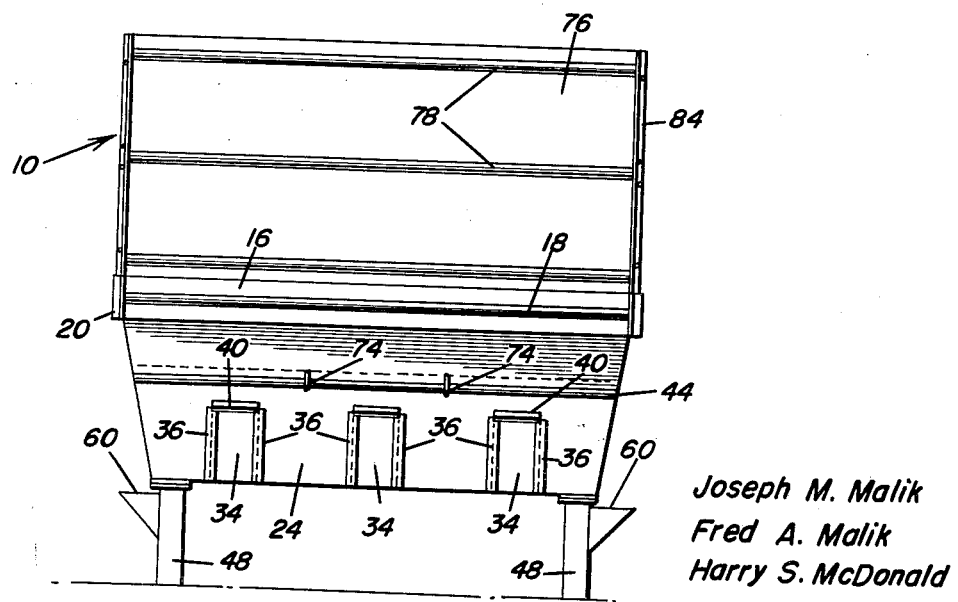
FIGURE 2 is a side elevation of the bulk bin.
Figure 3:
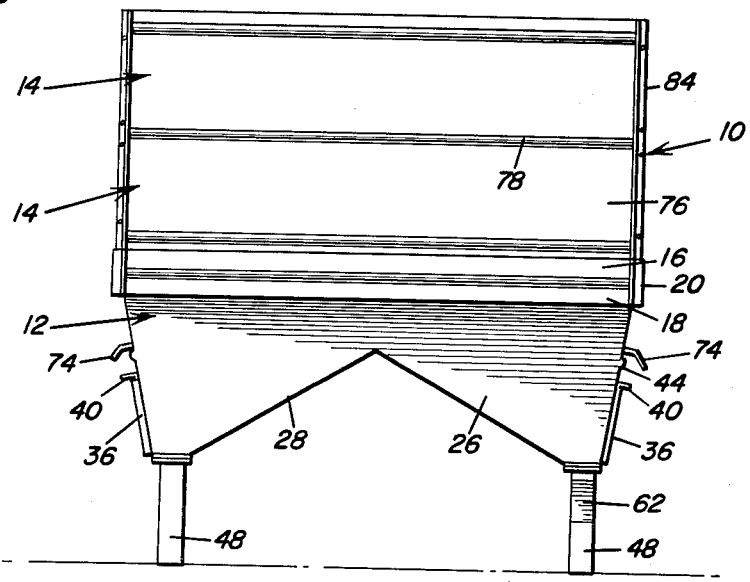
FIGURE 3 is an end elevation of the bin.
Figure 4:
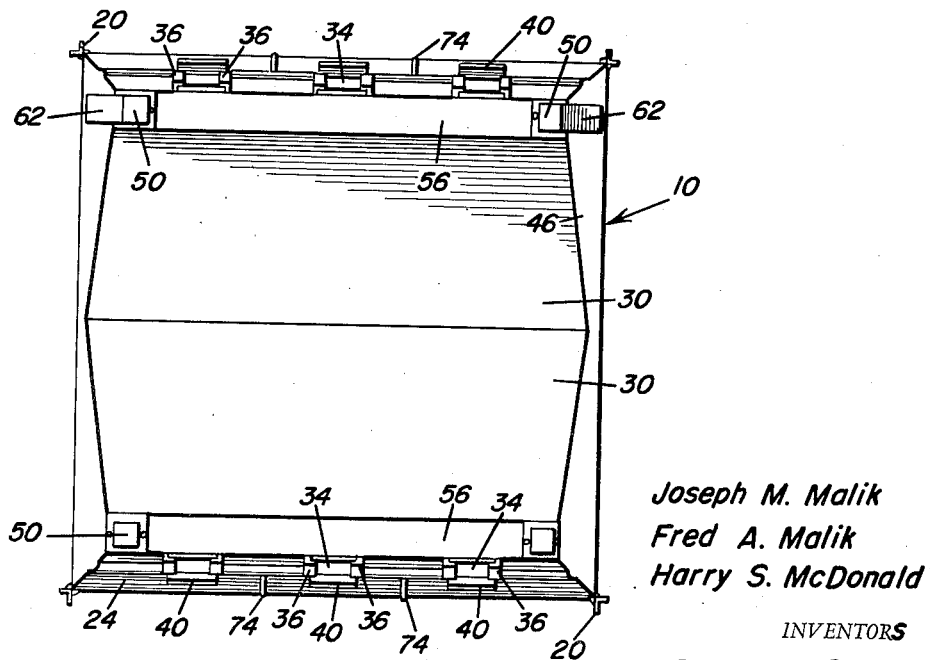
FIGURE 4 is a bottom plan view of the bin.
Figure 5:
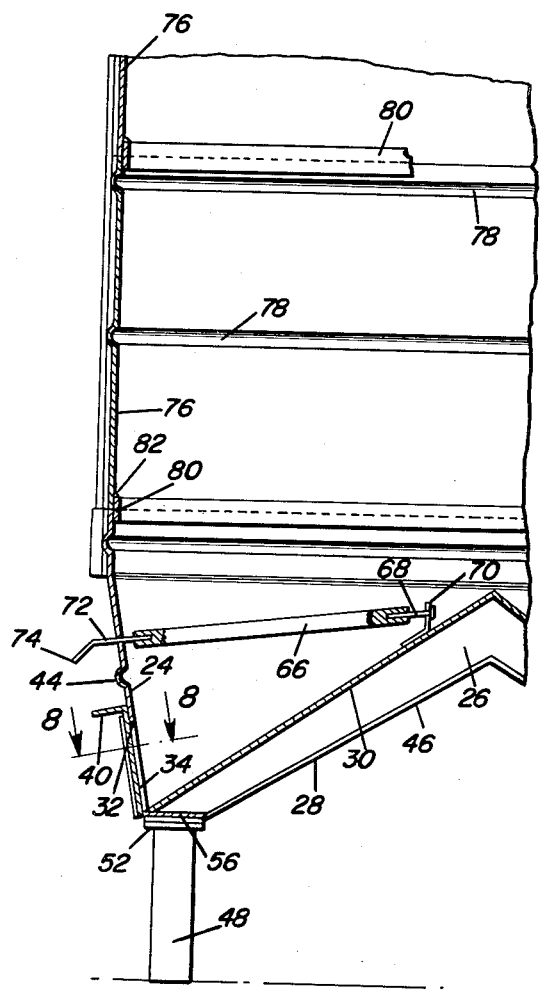
FIGURE 5 is a detailed fragmental sectional view taken substantially upon a plan passing along section line 5—5 of FIGURE 1 illustrating the construction of the discharge openings and the agitators for the material.
Figure 7:
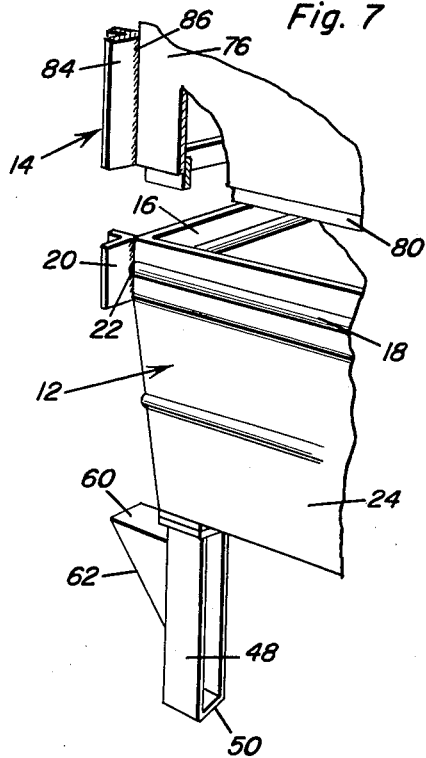
FIGURE 7 is an exploded fragmental perspective view with portions broken away illustrating the manner in which the sections of the bin are interengaged with each other.
Figure 8:
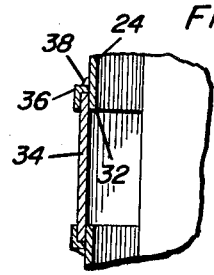
FIGURE 8 is a sectional view taken substantially upon a plane passing along section line 8—8 of FIGURE 5 illustrating further structural details of the dispensing openings and closure therefor.
Figure 6:
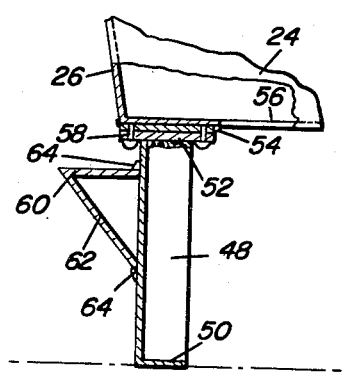
FIGURE 6 is a detailed fragmental sectional view illustrating the connection for the supporting legs.

Referring now specifically to the drawings, the numeral 10 generally designates the storage bin of the present invention. Briefly, the storage bin includes a lower section generally designated by the numeral 12 and an upper sectional generally designated by the numeral 14 as indicated in FIGURE 7 and the upper section 14 may be duplicated for extending the vertical height of the bin to a height desired for purposes of receiving the desired quantity of material. As shown in FIGURE 5, two upper sections are used for the purposes of illustration and both of the upper sections are designated by the numeral 14 since the upper sections are identical.

The lower section 12 includes a peripheral vertically disposed wall 16 of relatively short height which has a longitudinal reinforcing rib or boss 18 formed therein and which has an outwardly facing angle iron reinforcement member 20 on each corner thereof with the apex of the angle iron member 20 being secured to the corner of the peripheral wall 16 by welding 22 or the like. The device is illustrated as being substantially square with it being understood that the peripheral wall 16 is provided with four corners therein which defines four separate walls. Extending downwardly and integral with the lower edge of the wall 16 is a pair of converging side walls 24 and a pair of converging end walls 26. The walls 24 and 26 taper inwardly a slight degree and each of the end walls 26 has an enlarged inverted V-shaped notch 28 in the lower edge thereof which defines two separate compartments inasmuch as the notch 28 extends for a major portion of the distance between the bottom of the peripheral wall 16 and the bottom of the end wall 26. Interconnecting the end walls 26 is a pair of inclined bottom members 30 which are also joined to the side walls 24 whereby the bottom members 30 define two separate compartments in the lower section 12 and combine with the inclined side walls 24 to provide for increased effectiveness of flow of material to discharge openings which are formed in the side walls 24.

Each side wall 24 is provided with a plurality of openings 32 of generally rectangular configuration with each opening 32 being normally closed by a sliding door 34 which is received in trackways 36 extending parallel to the edges of the openings 32 and which are secured to the side wall 24 as by welding 38 or the like. The upper end of the closure door 34 is provided with a laterally extending handle 40 which extends outwardly of the side wall 24. The side wall 24 is also provided with a longitudinally extending reinforcing rib 44 therein. As illustrated in FIGURE 5, the bottom members 30 are disposed above the edges of the notch 28 with the edges of the notch 28 being inturned as shown in FIGURE 5 with the inturned portion being designated by the numeral 46 for purposes of reinforcing this portion of the end walls 26.

For supporting the lower section 12 in spaced relation to a supporting surface, corner legs 48 are provided with each leg 48 being generally of a channel shaped configuration having the ends thereof closed by a bottom member 50 and a top member 52. The top member 52 extends beyond the confines of the leg 48 and is in matching engagement with a plate 54 welded or otherwise secured to a partial double bottom member 56. Fasteners 58 rigidly secure the top member 52 to the bin and also retain the leg 48 detachably thereon. The leg 48 also is provided with a laterally extending step 60 connected thereto with the step being reinforced by a downwardly and inwardly inclined brace 62 with the braces and steps being secured by welding 64 whereby a person may engage the step 60 for purposes of peering into the bin for determining the quantity of material therein.

For agitating the material in each section of the lower bin 12, there is provided a plurality of elongated agitating bars 66 in each compartment and each bar 66 having a pin 68 extending longitudinally from the inner end, the pin being received in a bracket 70 mounted on the bottom member 30. The outer end of the bar or rod 66 is provided with a longitudinally extending handle member 72 which extends through the side wall 24 and terminates in a hand grip 74 whereby the hand grip 74 may be engaged for rotating the polygonal bars or rods 66 about the longitudinal axis thereof for agitating the material in each section of the lower bin so that the material will proceed through the discharge openings 32.

Each of the upper sections 14 includes a peripheral vertical wall 76 having a longitudinal reinforcing boss 78 therein adjacent the center and adjacent the upper end thereof. The lower end edge of each section 14 is provided with a flange 80 welded to the wall 76 as by welding 82 with the flange 80 depending below the lower end of the wall 76 and offset inwardly for telescoping engagement with the wall 16 of the lower section 12 or the wall 76 of an underlying upper section 14.

Each corner edge of the wall 76 is provided with a reinforcement in the form of a vertically disposed and outwardly facing angle iron member 84 having the apex thereof welded to the corner of the wall 76 as by welding 86 thus rigidifying the sections and providing further abutting engagement with the underlying sections.

The upper sections are assembled onto the lower sections without the use of any screws or other fastening means and thus permits easy assembly and disassembly for movement to a new location if desired. This also provides for an expansible type of bin which may be expanded by merely adding on additional upper sections. The agitating bars 66 rotate clockwise or counterclockwise and may also slide longitudinally which creates a vibration and serves a purpose of vibration and actual contact with the material for assuring flow of the material to the discharged openings which are positively closed by the closure dors 34 which are of the sliding type.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A bin assembly comprising a plurality of vertically stacked sections in interlocking engagement with each other, the lowermost section having a vertically disposed peripheral wall at the upper end thereof, said peripheral wall having depending inwardly inclined side walls and depending inwardly inclined end walls, an inverted V-shaped bottom member interconnecting the end walls and forming two discharge compartments, each of the side walls having a plurality of discharge openings therein extending to the bottom edge thereof, a sliding closure plate for each of said openings, trackways on the outer surface of the side walls for slidably receiving the closure doors, each closure door having a laterally extending handle on the upper end thereof for manual manipulation, a plurality of agitator bars disposed in each discharge compartment with the inner end of each agitator bar being slidably and rotatably mounted on the bottom member adjacent the apex thereof, the outer end of each of the bars being slidably and rotatably mounted in the side wall and extending therethrough, the outer end of the bars terminating in handles for manipulation of the bars for agitating the material to assure its discharge through the openings, depending legs rigidly secured to the corners of the bin formed by the downwardly inclined side and end walls with the legs disposed interiorly of the confines of the side and end walls, the vertical peripheral wall of the lowermost section and each upper section including an angle iron reinforcement member attached rigidly to the corner thereof with the apex of the angle iron reinforcement being secured to the corner of the section thereby reinforcing the sections and also limiting the interlocking engagement between the sections.

2. The structure as defined in claim 1 wherein one of said legs includes a laterally extending step thereon to provide an elevated support for a person looking into the top of the bin to observe the quantity of material therein.

References Cited in the file of this patent

UNITED STATES PATENTS

| | | |
|---|---|---|
| 219,911 | Clark | Sept. 23, 1879 |
| 1,010,801 | Rapp | Dec. 5, 1911 |
| 1,116,177 | Wakefield | Nov. 3, 1914 |
| 2,299,702 | Mosel | Oct. 20, 1942 |
| 2,701,080 | Franklin | Feb. 1, 1955 |
| 2,802,603 | McCray | Aug. 13, 1957 |